United States Patent
Li et al.

(10) Patent No.: US 9,482,809 B2
(45) Date of Patent: Nov. 1, 2016

(54) PLANAR LIGHT SOURCE

(71) Applicants: Ching-Hsiang Li, Hsin-Chu (TW); Min-Chun Chou, Hsin-Chu (TW); Chien-Hui Lee, Hsin-Chu (TW)

(72) Inventors: Ching-Hsiang Li, Hsin-Chu (TW); Min-Chun Chou, Hsin-Chu (TW); Chien-Hui Lee, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 14/321,834

(22) Filed: Jul. 2, 2014

(65) Prior Publication Data
US 2015/0078034 A1    Mar. 19, 2015

(30) Foreign Application Priority Data
Sep. 13, 2013 (CN) .......................... 2013 1 0418255

(51) Int. Cl.
*F21V 33/00* (2006.01)
*F21V 8/00* (2006.01)

(52) U.S. Cl.
CPC ........... *G02B 6/0068* (2013.01); *G02B 6/0021* (2013.01); *G02B 6/0016* (2013.01); *G02B 6/0043* (2013.01)

(58) Field of Classification Search
CPC ........ F21V 13/04; F21V 5/02; F21V 19/001; F21Y 2101/02; F21Y 2103/003; G02B 6/0021; G02B 6/0038; G02B 6/0046; G02B 6/0068; G02B 6/00; G02B 6/001; G02B 6/0043; G02B 6/0016; G02B 6/002; G02B 6/0028; G02B 6/0031; G02B 6/0036; G02B 6/005; G02B 6/0073; G02B 6/0091; G02F 1/133615; G02F 1/133603; G02F 1/133524; G02F 1/1336; G09F 9/33; G09F 13/18; G09F 2013/049

USPC ........ 362/326, 327, 607–613, 615–617, 620, 362/621, 623, 625, 626
See application file for complete search history.

(56) References Cited

U.S. PATENT DOCUMENTS

| | | | | |
|---|---|---|---|---|
| 3,892,959 A * | 7/1975 | Pulles | | 362/613 |
| 6,530,670 B2 * | 3/2003 | Hirayama | | 362/628 |
| 6,910,783 B2 * | 6/2005 | Mezei et al. | | 362/615 |
| 6,913,366 B2 | 7/2005 | Lee | | |
| 7,507,012 B2 * | 3/2009 | Aylward et al. | | 362/625 |
| 7,780,330 B2 * | 8/2010 | Aylward et al. | | 362/613 |
| 8,147,111 B2 * | 4/2012 | Wang et al. | | 362/615 |

(Continued)

FOREIGN PATENT DOCUMENTS

| | | |
|---|---|---|
| CN | 102506361 | 6/2012 |
| JP | 4737409 | 8/2011 |
| TW | M316410 | 8/2007 |
| TW | I314663 | 9/2009 |

*Primary Examiner* — Hargobind S Sawhney
(74) *Attorney, Agent, or Firm* — Jianq Chyun IP Office (57) ABSTRACT

A planar light source including an LGP and first and second light sources are provided. The LGP has a first surface and a second surface opposite to each other and a first groove and a second groove. The first groove and the second groove are respectively located on the first surface and the second surface, and are respectively located at two sides of a center line of the LGP, where the center line equally divides the first surface and the second surface. The first groove has a first side surface and a first light incident surface, and the second groove has a second side surface and a second light incident surface, where the light sources are disposed in the grooves. The light sources are suitable for respectively providing a light beam entering the LGP through the corresponding light incident surface.

15 Claims, 5 Drawing Sheets

(56) References Cited

U.S. PATENT DOCUMENTS

| | | | | |
|---|---|---|---|---|
| 8,267,563 B2* | 9/2012 | Kim | ................. | G02B 6/0021 362/612 |
| 8,337,066 B2* | 12/2012 | Yeh et al. | ................. | 362/612 |
| 2008/0137373 A1* | 6/2008 | Li | ................. | G02B 6/002 362/620 |

* cited by examiner

PLANAR LIGHT SOURCE

CROSS-REFERENCE TO RELATED APPLICATION

This application claims the priority benefit of China application serial no. 201310418255.5, filed on Sep. 13, 2013. The entirety of the above-mentioned patent application is hereby incorporated by reference herein and made a part of this specification.

BACKGROUND

1. Technical Field

The invention relates to a planar light source. Particularly, the invention relates to a dual-side edge lighting type planar light source.

2. Related Art

In recent years, along with increase of light emitting efficiency and a service life of light emitting diodes (LEDs), and due to features and advantages of low power consumption, low pollution, high efficiency, high response speed, small size, light weight and capability of being configured on various surfaces, the LEDs are widely applied in various optical fields. Generally, the LEDs can be applied in illumination apparatus and flat panel displays (for example, liquid crystal displays (LCDs)).

Taking an application of the LEDs in the LCD as an example, the LEDs can be applied to a backlight module of the LCD for providing a uniform planar light source. A conventional LED backlight module includes a plurality of LEDs, a light guide plate and a reflector, etc., where the light guide plate may effectively convert the light emitted by the LED light source into a planar light source with a high luminance and good uniformity.

Presently, development of high luminance LEDs has become mature, when the high luminance LEDs are applied to the backlight module, the number of utilized LEDs can be effectively reduced. According to the existing technique, a design of disposing the LEDs at a corner of the light guide plate is provided, which may greatly decrease the number of the utilized LEDs to reduce the manufacturing cost.

Although the number of the high luminance LEDs used in the backlight module is relatively less, if an arrangement pitch between the adjacent LEDs is excessively large, hot spots may still appear at an edge of the light guide plate. In detail, in the known planar light source, the arrangement pitch of any two adjacent LEDs is P, and a shortest distance between a light emitting surface of each of the LEDs and an active area of the light guide plate is A. Generally, the manufacturer may optimize a ratio of A and P, i.e. an A/P ratio, according to a divergence angle of the LED. When the A/P ratio is lower, i.e. when the pitch P is excessively large/or the distance A is excessively small, a hot spot with lower luminance can appear at an edge of the active area (corresponding to a position between the LEDs), which influences uniformity of the planar light source. When the A/P ratio is higher, i.e. when the pitch P is excessively small/or the distance A is excessively large, the hot spot with lower luminance is not liable to appear at the edge of the active area.

Therefore, considering a demand on uniformity of the planar light source and reduction of manufacturing cost, how to eliminate the hot spots in the active area becomes an important issue in research and development of the planar light source.

China Patent No. 102506361A discloses an LED backlight module, in which a light source is disposed between a back plate and a light guide plate, where a light emitting surface of the light source faces to a light incident surface of the light guide plate, and is disposed in a certain angle between 0 degree and 90 degrees, and a groove is formed on the light guide plate at a position corresponding to the light emitting surface of the light source.

U.S. Pat. No. 8,267,563B2 discloses a light guide plate, in which a light incident surface includes a first light incident surface, a second light incident surface and a third light incident surface, where the first and the third light incident surfaces are symmetric to an intersection of a center line and a side of the light guide plate, and the light sources are also symmetric to the center line.

Japan Patent No. 4737409 discloses a light guide plate with point light sources disposed at a short side of the light guide plate, and two point light sources are disposed at a position that makes the emitted light diverging from a center line of a light emitting surface of the light guide plate.

China Taiwan Patent No. I314663 discloses a light guide plate, where a side of the light guide plate is designed in a groove shape concaved inward in collaboration with the number of LEDs to be used, and the light guide plate has light incident surfaces that are not in a same plane, and the LEDs are respectively disposed on the light incident surfaces in the grooves.

China Taiwan Patent No. M316410 discloses a light guide plate in which the light sources are disposed corresponding to a corner position of the light guide plate, and two concave surfaces concaved inwards into the light guide plate are formed at the corner position, where the concave surfaces are respectively a plane, and two light sources are disposed corresponding to each of the concave surfaces.

SUMMARY

The invention is directed to a planar light source, which has good light usage efficiency.

Other objects and advantages of the invention can be further illustrated by the technical features broadly embodied and described as follows.

In order to achieve one or a portion of or all of the objects or other objects, an embodiment of the invention provides a planar light source including a light guide plate and at least one first light source and at least one second light source. The light guide plate has a first surface and a second surface opposite to each other and at least one first groove and at least one second groove. The first groove and the second groove are respectively located on the first surface and the second surface. Moreover, the first groove and the second groove are respectively located at two sides of a center line of the light guide plate, and the center line substantially divides the first surface and the second surface equally. The first groove has a first side surface and a first light incident surface, and the second groove has a second side surface and a second light incident surface. The first light source and the second light source are respectively disposed in the first groove and the second groove. The first light source is suitable for providing a first light beam entering the light guide plate through the first light incident surface, and the second light source is suitable for providing a second light beam entering the light guide plate through the second light incident surface.

In an embodiment of the invention, the light guide plate is a rectangular light guide plate.

In an embodiment of the invention, lengths of the first surface and the second surface are L, an included angle between the first light incident surface and the first surface and an included angle between the second light incident surface and the second surface are α, a shortest distance between the first light incident surface and the center line and a shortest distance between the second light incident surface and the center line are D, a half of a divergence angle of the first light beam emitted by the first light source and a half of a divergence angle of the second light beam emitted by the second light source are θ, and a shortest distance between an active area of the light guide plate and the first surface and shortest distance between the active area and the second surface are A, where L, a, D, θ and A satisfy a following equation:

$$0 \le (D+L/2) \times \tan(90°-\theta-\alpha) \le A+5.$$

In an embodiment of the invention, the first groove and the second groove are respectively a polygonal columnar groove.

In an embodiment of the invention, the polygonal columnar groove includes a triangle columnar groove or a trapezoid columnar groove.

In an embodiment of the invention, at least one of the first light incident surface and the second light incident surface is a plane or a curved surface.

In an embodiment of the invention, at least one of the first light incident surface and the second light incident surface is a roughened surface.

In an embodiment of the invention, at least one of the first side surface and the second side surface is a bended surface.

In an embodiment of the invention, propagation directions of the first light beam provided by the first light source and the second light beam provided by the second light source are parallel and opposite to each other.

In an embodiment of the invention, the planar light source further includes a plurality of optical microstructures, and the optical microstructures are disposed on at least one of the first light incident surface and the second light incident surface.

In an embodiment of the invention, the optical microstructures are micro-lenticular microstructures or prism-like microstructures.

In an embodiment of the invention, the light guide plate further includes a plurality of scattering microstructures, and the scattering microstructures are distributed on the bottom surface of the light guide plate.

In an embodiment of the invention, the scattering microstructures are prism-like microstructures or micro-lenticular microstructures.

In an embodiment of the invention, a distribution density of the scattering microstructures increases along a direction from the first light incident surface and the second light incident surface towards a center of the light guide plate.

In an embodiment of the invention, the planar light source further includes a reflector disposed on the bottom surface.

According to the above descriptions, by suitably setting the first groove, the second groove, the first light source and the second light source, the planar light source of the invention has good light usage efficiency and good uniformity.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
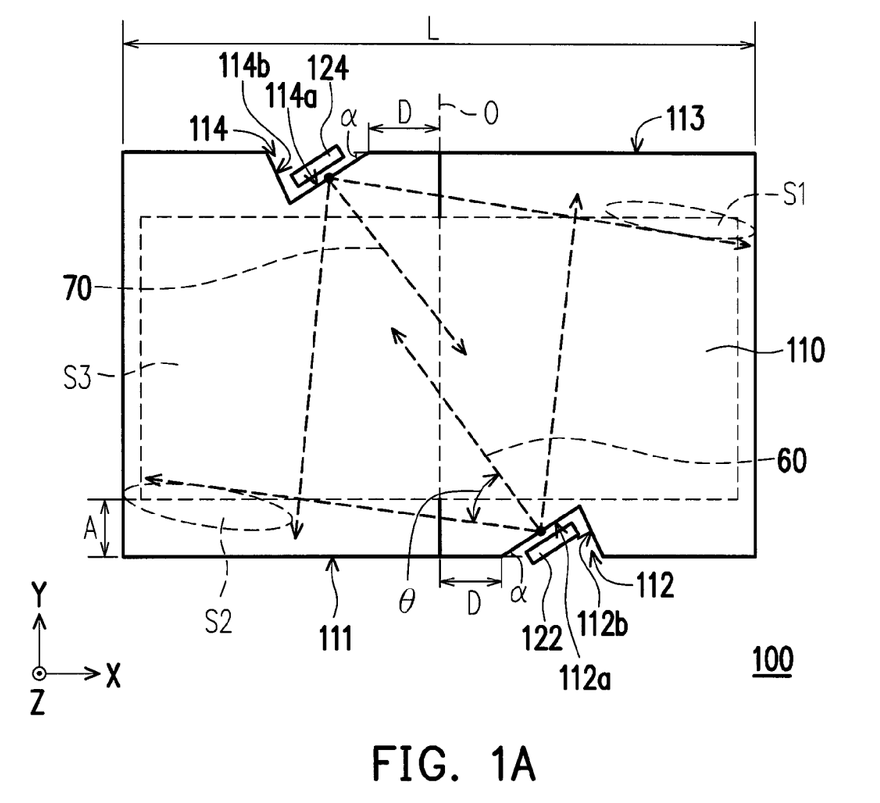
FIG. 1A is a top view of a planar light source according to an embodiment of the invention.
Figure 1B:
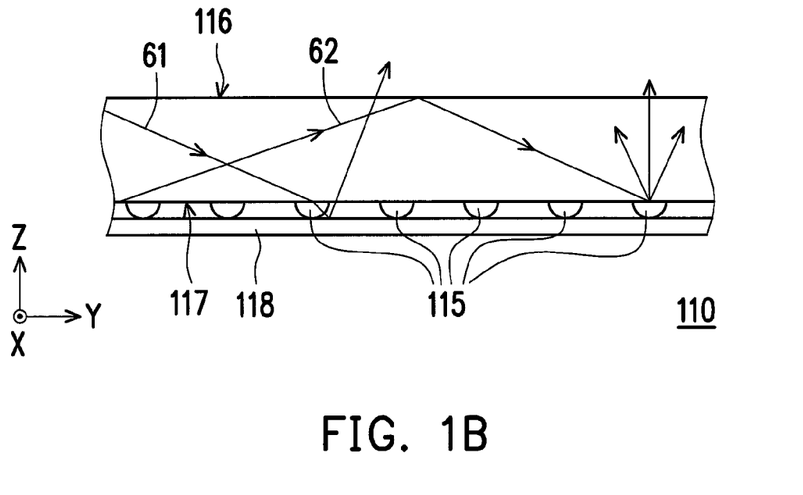
FIG. 1B is a cross-sectional view of a light guide plate of FIG. 1A.

FIG. 1A is a top view of a planar light source according to an embodiment of the invention, and FIG. 1B is a cross-sectional view of the planar light source of FIG. 1A along a center line O. Referring to FIG. 1A and FIG. 1B, the planar light source 100 of the present embodiment includes a light guide plate 110, a reflector 118, at least one first light source 122 and at least one second light source 124. The light guide plate 110 has a first surface 111, a second surface 113, a bottom surface 117 connected to the first surface 111 and the second surface 113 and a light emitting surface 116 opposite to the bottom surface 117, where the first surface 111 is opposite to the second surface 113. Moreover, the light guide plate 110 further has at least one first groove 112 and at least one second groove 114, and the first groove 112 and the second groove 114 are respectively located on the first surface 111 and the second surface 113. Moreover, the first groove 112 and the second groove 114 are respectively located at two sides of the center line O of the light guide plate 110. The center line O is located on the light emitting surface 116, and the center line O is substantially perpendicular to the first surface 111 and the second surface 113 and equally divides the light emitting surface 116. In the embodiment, an extending direction of the first surface 111 and the second surface 113 is, for example, parallel to an X-direction. Moreover, a material of the light guide plate 110 can be a compound with high transmittance. For example, the material of the light guide plate 110 is polymethyl methacrylate (PMMA), polycarbonate (PC), cycoolefin copolymer (COC) or other suitable light guiding materials.

The first light source 122 and the second light source 124 are respectively disposed in the first groove 112 and the second groove 114. The first groove 112 has a first light incident surface 112a and a first side surface 112b, and the second groove 114 has a second light incident surface 114a and a second side surface 114b. The first light source 122 provides a first light beam 60, and the second light source 124 provides a second light beam 70, where the first light beam 60 enters the light guide plate 110 through the first light incident surface 112a of the first groove 112, and the second light beam 70 enters the light guide plate 110 through the second light incident surface 114a of the second groove 114. In the embodiment, propagation directions of the first light beam 60 and the second light beam 70 are, for example, parallel and opposite to each other. Moreover, in the embodiment, the light sources 122 and 124 are, for example, light emitting diodes (LEDs), though the invention is not limited thereto, and in other applicable embodiments, the first light source 122 and the second light source 124 can be point light sources of other type, and the number of the first light sources 122 and the number of the second light sources 124 are not limited to one. The number of point light sources can be adjusted according to a requirement and the size of the light guide plate.

On the other hand, a divergence angle of the first light beam 60 emitted by the first light source 122 and a divergence angle of the second light beam 70 emitted by the second light source 124 are 2θ, in other words, a half of each of the divergence angles of the first light beam 60 and the second light beam 70 is θ, as that shown in FIG. 1A. On the other hand, an included angle between the first light incident surface 112a and the first surface 111 and an included angle between the second light incident surface 114a and the second surface 113 are α. For example, α is between 30 degrees and 60 degrees. The design of the included angle α is based on the principle that the first light beam 60 and the second light beam 70 have a maximum light illumination range after entering the light guide plate 110.

Referring to FIG. 1B, in the embodiment, the reflector 118 is disposed on the bottom surface 117. Taking the first light beam 60 emitted by the first light source 122 as an example, when sub light beams 61 and 62 of the first light beam 60 enter the light guide plate 110, the sub light beams 61 and 62 are propagated through total reflection. Then, under a function of scattering microstructures 115 of the bottom surface 117, the sub light beams 61 or 62 is reflected back into the light guide plate 110 or directly leaves the light guide plate 110 through the light emitting surface 116.

It should be noticed that in the planar light source 100 of the embodiment, a method of forming the scattering microstructures 115 is that, for example, the scattering microstructures 115 and the light guide plate 110 are formed integrally by injection molding. When the scattering microstructures 115 and the light guide plate 110 are formed by injection molding, the scattering microstructures 115 and the light guide plate 110 are made of the same material. In other applicable embodiments, the method of forming the scattering microstructures 115 can also be other suitable processing methods. For example, after the light guide plate 110 is formed by injection molding, lattice points (i.e. the scattering microstructures 115) can be formed on the bottom of the light guide plate 110 through screen printing. When the scattering microstructures 115 are formed through screen printing, materials of the light guide plate 110 and the scattering microstructures 115 can be the same or different. The scattering microstructures 115 on the bottom surface 117 can be fabricated through other methods, which are not limited in the invention.

In order to optimize light emitting uniformity of the planar light source 100 to avoid insufficient luminance of the planar light source 100 at corner regions S1 and S2 (shown in FIG. 1A), a distribution density of the scattering microstructures 115 on the bottom surface 117 of the light guide plate 110 can be adjusted to ameliorate and improve the light emitting uniformity of the planar light source 100. The distribution density of the scattering microstructures 115 on the light guide plate 110 is described in detail below with reference of FIG. 1C.

Figure 1C:
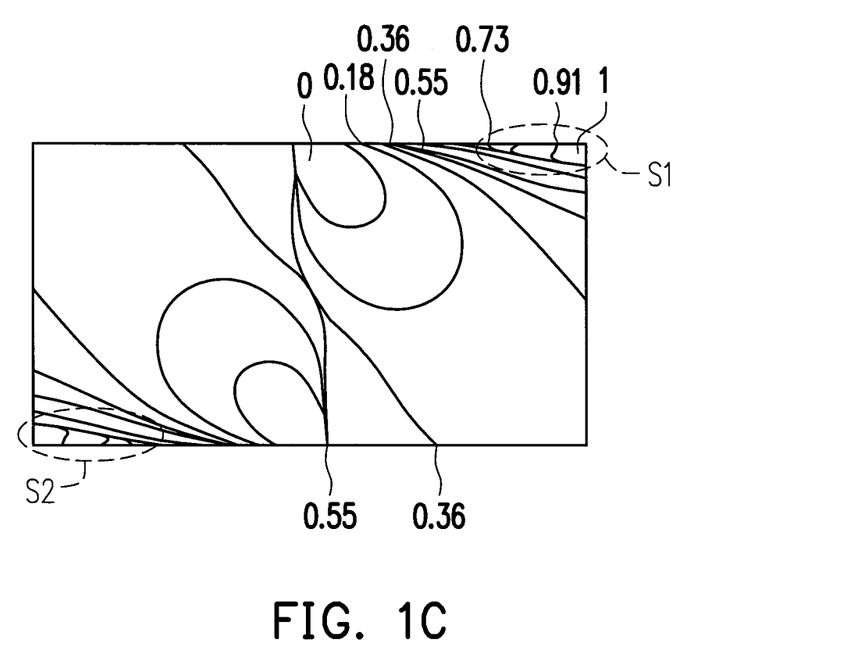
FIG. 1C illustrates a distribution of scattering microstructures of the light guide plate of FIG. 1A.

FIG. 1C illustrates a distribution of the scattering microstructures of the light guide plate of FIG. 1A. Referring to FIG. 1A to FIG. 1C, since the scattering microstructures 115 on the bottom surface 117 of the light guide plate 110 are mainly used for scattering the lights, enabling the lights to be guided to emit out through the light emitting surface 116 of the light guide plate 110, in a region with higher distribution density of the scattering microstructures 115, a higher proportion of the lights is guided to emit out of the light guide plate 110. Therefore, in order to achieve a uniform distribution of the whole luminance of the planar light source 100, the scattering microstructures 115 have a lower distribution density at regions with higher light intensity. Conversely, the scattering microstructures 115 have a higher distribution density at regions with lower light intensity. For example, at a place close to the first light incident surface 112a or the second light incident surface 114a, the distribution density of the scattering microstructures 115 is lower, and the distribution density of the scattering microstructures 115 is increased along a direction away from the first light incident surface 112a or the second light incident surface 114a, as that shown in FIG. 1C. On the other hand, the distribution density of the scattering microstructures 115 at the corner regions S1 and S2 are required to be particularly gained, such that a light emitting amount at the corner regions S1 and S2 is not lower than that at the other regions, and the lights therein are greatly scattered to emit out of the light guide plate 100 to enhance the luminance of the hot spots at the corner regions S1 and S2. Accordingly, based on the suitably designed distribution density of the scattering microstructures 115, the light emitting uniformity of the planar light source 100 is enhanced.

In the embodiment, a shortest distance between the first light incident surface 112a and the center line O and a shortest distance between the second light incident surface 114a and the center line O are D, and those skilled in the art can modify the shortest distance D according to an actual requirement.

A detailed design (for example, a relationship among the half divergence angle θ, the included angle α and the distance D) of the planar light source 100 is described below.

In the embodiment, the light guide plate 110 is, for example, a rectangular light guide plate, though the invention is not limited thereto.

Lengths of the first surface 111 and the second surface 113 are L, and a shortest distance between an active area S3 of the light guide plate 110 and the first surface 111 and a shortest distance between the active area S3 and the second surface 113 are A. The above parameters L, A, the half divergence angle θ, the included angle α and the distance D satisfy a following equation:

$$0 \leq (D+L/2) \times \tan(90°-\theta-\alpha) \leq A+5.$$

In the embodiment, when the divergence angle (2θ) of the first light beam 60 and the second light beam 70 is 120 degrees (i.e. a half of the divergence angle of the first light beam 60 and the second light beam 70 is 60 degrees), the length L is between 310-320 mm, the included angle α is 43 degrees, and the distance D is between 9-10 mm, the planar light source has good light emitting uniformity. In an exemplary embodiment, when the length L is 313 mm, and the distance D is 9 mm, the distribution of the scattering microstructures 115 is as that shown in FIG. 1C, and through optical simulation, it is known that the corner regions S1 and S2 do not have hot spots, and the light emitting uniformity of the planar light source 100 reaches 74%, which meets a current requirement on the light source uniformity. It should be noticed that the aforementioned value ranges are only used as an example, which are not used for limiting the invention.

Figure 1D:
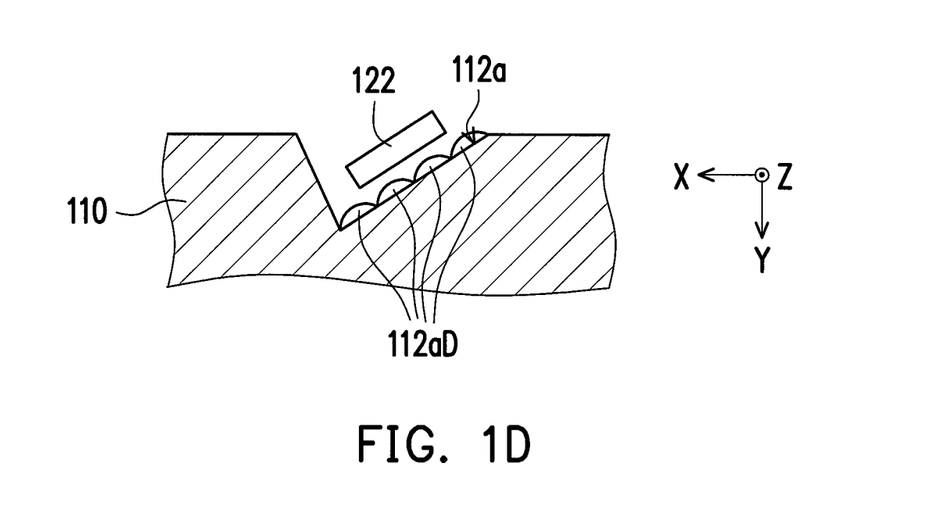
FIG. 1D, FIG. 1E, FIG. 1F and FIG. 1G are schematic diagrams of different light incident surfaces according to another embodiment of the invention.
Figure 1E:
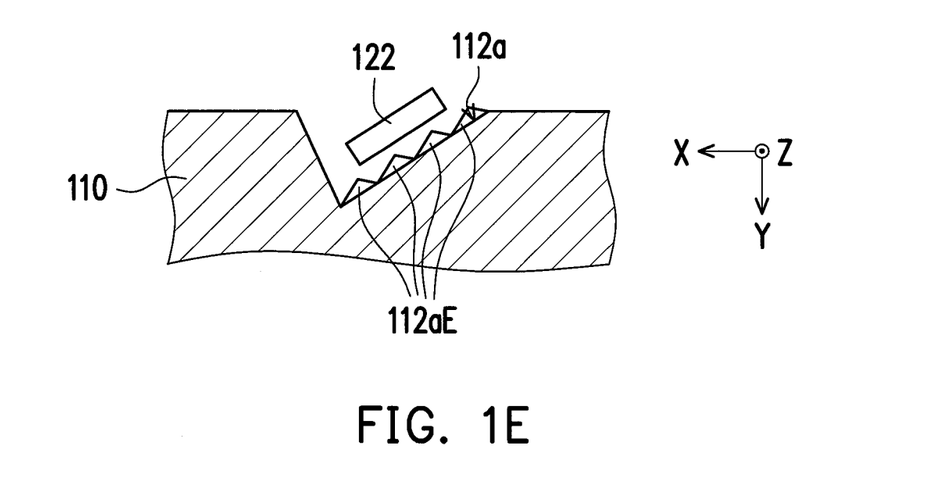

FIG. 1D, FIG. 1E, FIG. 1F and FIG. 1G are schematic diagrams of different light incident surfaces according to another embodiment of the invention. Referring to FIG. 1D to FIG. 1E, in the embodiment, the first light incident surface 112a of the planar light source 100 further includes a plurality of optical microstructures, for example, a plurality of micro-lenticular microstructures 112aD (shown in FIG. 1D) or a plurality of prism-like microstructures 112aE (shown in FIG. 1E). Based on the above design, after the first light beam 60 of the first light source 122 enters the light guide plate 110, the divergence angle of the first light beam 60 is enlarged to increase a luminance coverage rate, so as to enhance the light emitting uniformity of the planar light source 100. It should be noticed that the second light incident surface 114a also has the similar design and has the same effect.

Figure 1F:
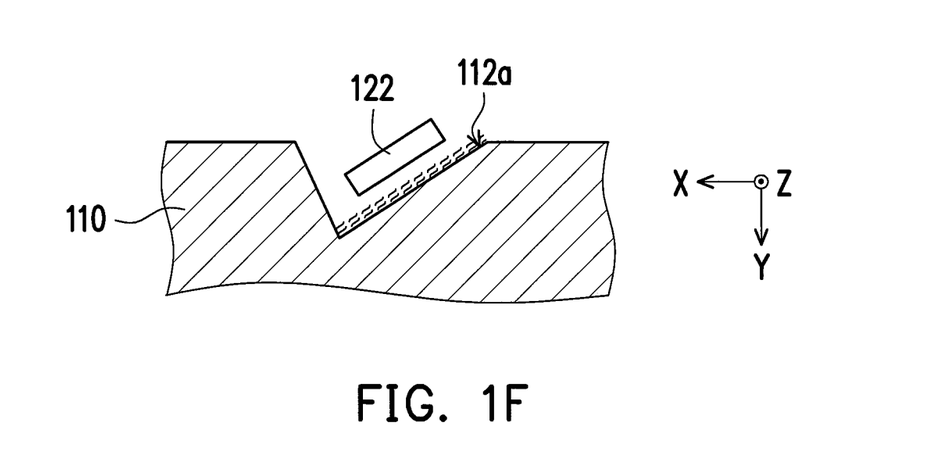
Figure 1G:
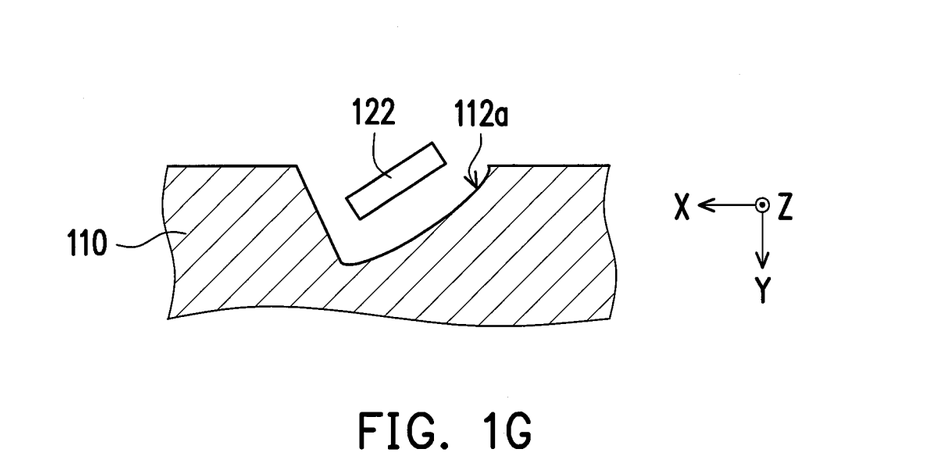

Moreover, referring to FIG. 1F, the first light incident surface 112a of the planar light source 100 can be a roughened surface. Similarly, the second light incident surface 114a has a similar design. Moreover, as that shown in FIG. 1G, the first light incident surface 112a of the light guide plate 110 can be a curved surface. Similarly, the second light incident surface 114a has a similar design and has similar effect as that of the above optical microstructures.

It should be noticed that although the first groove 112 and the second groove 114 are implemented as triangle columnar grooves in the embodiment, the invention is not limited thereto, and in other applicable embodiments, the first groove 112 and the second groove 114 are other polygonal columnar grooves. Possible variations of the groove are described below with reference of FIG. 2.

Figure 2:
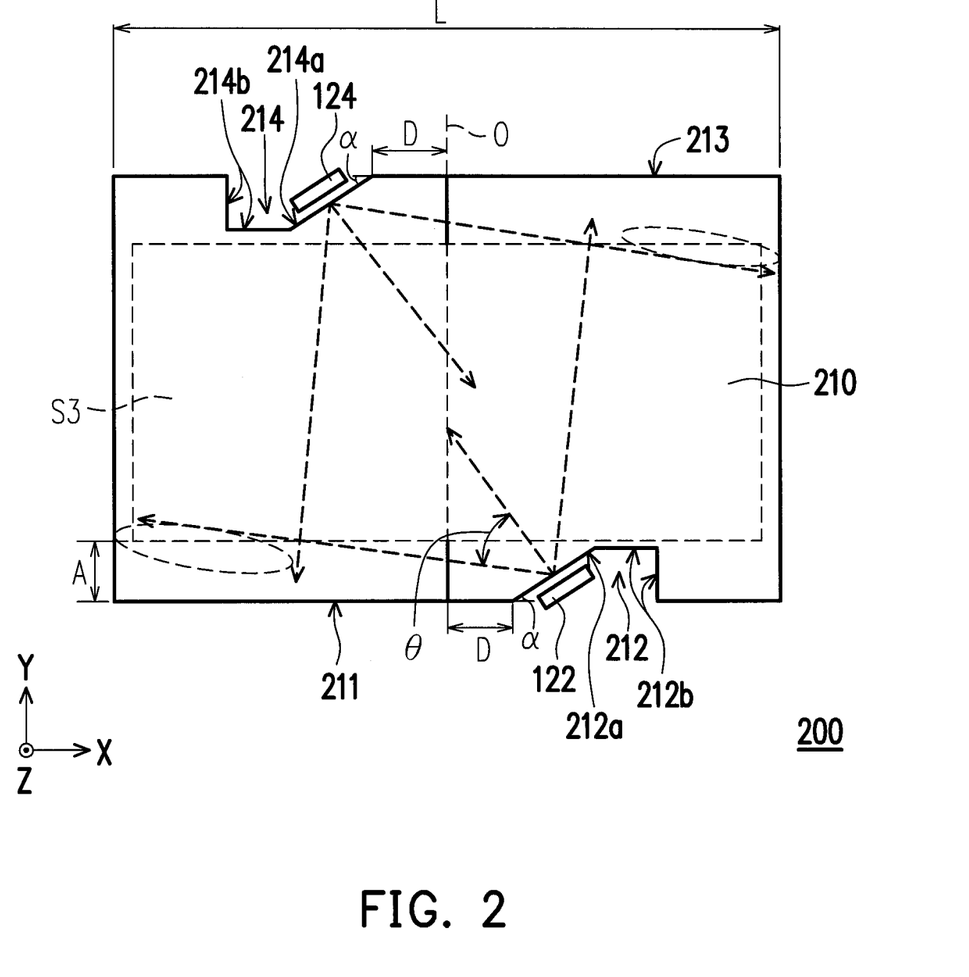
FIG. 2 is a top view of a planar light source according to another embodiment of the invention.

FIG. 2 is a top view of a planar light source according to another embodiment of the invention. Referring to FIG. 2, in the embodiment, a light guide plate 210 is similar to the light guide plate 110 of FIG. 1A, and a difference there between is that a first groove 212 and a second groove 214 of the light guide plate 210 are trapezoid columnar grooves. The first groove 212 includes a first light incident surface 212a and a first side surface 212b, and the second groove 214 includes a second light incident surface 214a and a second side surface 214b, where the first side surface 212b and the second side surface 214b are respectively a bended surface. It should be noticed that lengths of the first surface 211 and the second surface 213 are L, an included angle between the first light incident surface 212a and the first surface 211 and an included angle between the second light incident surface 214a and the second surface 213 are α, a shortest distance between the first light incident surface 212a and the center line O and a shortest distance between the second light incident surface 214a and the center line O are D, a half of a divergence angle of the first light beam 60 emitted by the first light source 122 and a half of a divergence angle of the second light beam 70 emitted by the second light source 124 are θ, and a shortest distance between the active area S3 of the light guide plate 210 and the first surface 211 and a shortest distance between the active area S3 and the second surface 213 are A, where L, a, D, θ and A satisfy a following equation:

$$0 \leq (D+L/2) \times \tan(90°-\theta-\alpha) \leq A+5.$$

Similarly, the first light incident surface 212a and the second light incident surface 214a selectively adopt the various patterns of the light incident surface illustrated in FIG. 1D-FIG. 1G.

In summary, by suitably setting the grooves and the light sources, the planar light source of the invention has good light usage efficiency and good uniformity. Moreover, the planar light source of the invention may have a better overall performance by applying the aforementioned detailed structure designs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A planar light source, comprising:
   a light guide plate having a first surface, a second surface, a bottom surface connected to the first surface and the second surface, a light emitting surface opposite to the bottom surface, a center line, at least one first groove and at least one second groove, wherein the first surface is opposite to the second surface, the first groove and the second groove are respectively located on the first surface and the second surface, and the first groove and the second groove are identical in cross sections and respectively located at two sides of the center line of the light guide plate, the center line is located on the light emitting surface, and is perpendicular to the first surface and the second surface and equally divides the light emitting surface, wherein the first groove has a first light incident surface and a first side surface, the second groove has a second light incident surface and a second side surface, and the first light incident surface and the second light incident surface are arranged in a face-to-face manner;
   at least one first light source and at least one second light source, respectively disposed in the first groove and the second groove, wherein the first light source is suitable for providing a first light beam entering the light guide plate through the first light incident surface, the second light source is suitable for providing a second light beam entering the light guide plate through the second light incident surface, and a propagation direction of the first light beam through the first light incident surface and a propagation direction of the second light beam through the second light incident surface are parallel and opposite to each other;
   wherein an included angle between the first light incident surface and the first surface and an included angle between the second light incident surface and the second surface are α, and α is between 30 degrees and 60 degrees.

2. The planar light source as claimed in claim 1, wherein the light guide plate is a rectangular light guide plate.

3. The planar light source as claimed in claim 1, wherein at least one of the first light incident surface and the second light incident surface is a curved surface.

4. The planar light source as claimed in claim 1, wherein at least one of the first light incident surface and the second light incident surface is a roughened surface.

5. The planar light source as claimed in claim 2, wherein lengths of the first surface and the second surface are L, a shortest distance between the first light incident surface and the center line and a shortest distance between the second light incident surface and the center line are D, a half of a divergence angle of the first light beam emitted by the first light source and a half of a divergence angle of the second light beam emitted by the second light source are θ, and a shortest distance between an active area of the light guide plate and the first surface and a shortest distance between the active area and the second surface are A, where L, a, D, θ and A satisfy a following equation:

$$0 \leq (D+L/2) \times \tan(90° - \theta - \alpha) \leq A + 5.$$

6. The planar light source as claimed in claim 1, wherein at least one of the first groove and the second groove is a polygonal columnar groove.

7. The planar light source as claimed in claim 6, wherein the first groove and the second groove comprise triangle columnar grooves or trapezoid columnar grooves.

8. The planar light source as claimed in claim 6, wherein at least one of the first side surface and the second side surface is a bended surface.

9. The planar light source as claimed in claim 1, wherein at least one of the first light incident surface and the second light incident surface is a plane.

10. The planar light source as claimed in claim 1, further comprising a plurality of optical microstructures disposed on at least one of the first light incident surface and the second light incident surface.

11. The planar light source as claimed in claim 10, wherein the optical microstructures are micro-lenticular microstructures or prism-like microstructures.

12. The planar light source as claimed in claim 1, wherein the light guide plate further comprises a plurality of scattering microstructures, and the scattering microstructures are distributed on the bottom surface of the light guide plate.

13. The planar light source as claimed in claim 12, wherein the scattering microstructures are prism-like microstructures or micro-lenticular microstructures.

14. The planar light source as claimed in claim 12, wherein a distribution density of the scattering microstructures increases along a direction from the first light incident surface and the second light incident surface towards a center of the light guide plate.

15. The planar light source as claimed in claim 1, wherein the planar light source further comprises a reflector disposed on the bottom surface.

* * * * *